(12) United States Patent
Parikh

(10) Patent No.: US 9,106,461 B2
(45) Date of Patent: Aug. 11, 2015

(54) QUARTER-RATE SPECULATIVE DECISION FEEDBACK EQUALIZER

(75) Inventor: Samir Parikh, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 13/554,763

(22) Filed: Jul. 20, 2012

(65) Prior Publication Data
US 2014/0024327 A1 Jan. 23, 2014

(51) Int. Cl.
*H04L 25/08* (2006.01)
*H04L 25/03* (2006.01)

(52) U.S. Cl.
CPC .............................. *H04L 25/03057* (2013.01)

(58) Field of Classification Search
CPC .................. H04L 25/03254; H04L 25/03267; H04L 25/03006; H04L 27/148; H04L 27/2334; H04L 25/03057; H04L 2025/0349; H04L 2025/03617; H04B 1/10; H04B 1/0017
USPC .................................. 375/233, 346, 348, 350
See application file for complete search history.

(56) References Cited

U.S. PATENT DOCUMENTS

| | | | | |
|---|---|---|---|---|
| 7,000,175 | B2* | 2/2006 | Azadet et al. .................. | 714/794 |
| 7,339,989 | B1* | 3/2008 | McAdam et al. .............. | 375/232 |
| 7,363,576 | B2* | 4/2008 | Azadet et al. .................. | 714/794 |
| 7,539,243 | B1* | 5/2009 | Toifl et al. ...................... | 375/229 |
| 8,472,515 | B1* | 6/2013 | Savoj ............................. | 375/233 |
| 8,477,833 | B2* | 7/2013 | Bulzacchelli et al. ........ | 375/233 |
| 2006/0093028 | A1* | 5/2006 | Balan et al. .................... | 375/233 |
| 2006/0288196 | A1* | 12/2006 | Unsal et al. .................... | 712/235 |
| 2008/0175311 | A1* | 7/2008 | Kitta ............................... | 375/232 |
| 2008/0187036 | A1* | 8/2008 | Park et al. ...................... | 375/233 |
| 2008/0310491 | A1* | 12/2008 | Abbasfar et al. .............. | 375/230 |
| 2008/0310495 | A1* | 12/2008 | Bulzacchelli et al. ........ | 375/233 |
| 2009/0010320 | A1* | 1/2009 | Hollis ............................. | 375/232 |
| 2009/0060021 | A1* | 3/2009 | Bulzacchelli .................. | 375/233 |
| 2009/0238240 | A1* | 9/2009 | Lakkis ........................... | 375/130 |
| 2010/0238993 | A1* | 9/2010 | Huang et al. .................. | 375/233 |
| 2011/0096825 | A1* | 4/2011 | Hollis ............................. | 375/233 |
| 2012/0207204 | A1* | 8/2012 | Hidaka .......................... | 375/233 |
| 2012/0314757 | A1* | 12/2012 | Bulzacchelli et al. ........ | 375/233 |
| 2013/0208779 | A1* | 8/2013 | Agrawal et al. ............... | 375/232 |
| 2013/0214865 | A1* | 8/2013 | Bulzacchelli et al. ........ | 330/261 |
| 2013/0230089 | A1* | 9/2013 | Hollis ............................. | 375/231 |
| 2013/0287089 | A1* | 10/2013 | Bulzacchelli et al. ........ | 375/233 |
| 2013/0322512 | A1* | 12/2013 | Francese et al. .............. | 375/233 |

OTHER PUBLICATIONS

M. Austin, "Decision-feedback equalization for digital communication over dispersive channels," M.I.T. Res. Lab Electron. Tech. Rep. 461, Aug. 1967.
C. Belfiore and J. Park, Jr., "Decision Feedback Equalization," Proceedings of the IEEE, vol. 67, No. 8, pp. 1143-1156, Aug. 1979.
Ibrahim, S. and Razavi, B., "Low-Power CMOS Equalizer Design for 20-Gb/s Systems", IEEE Journal of Solid-State Circuits, vol. 46, No. 6, pp. 1321-1336, May 2011.
V. Balan, et al, "A 4.8-6.4 Gb/s Serial Link for Backplane Applications Using Decision Feedback Equalization", IEEE JSSC, vol. 40, No. 9, pp. 1957-1968, Sep. 2005.

* cited by examiner

*Primary Examiner* — Emmanuel Bayard
(74) *Attorney, Agent, or Firm* — Maschoff Brennan

(57) ABSTRACT

According to an aspect of an embodiment of the present disclosure, a method of relaxing a timing constraint associated with reducing inter-symbol interference (ISI) of input data includes adding an ISI cancellation value to input data received at a first clock rate to generate first speculative data. The method further includes subtracting the ISI cancellation value from the input data to generate second speculative data. The method also includes sampling the first speculative data and the second speculative data at a second clock rate that is one-fourth of the first clock rate such that a timing constraint associated with performing the ISI reduction is relaxed.

21 Claims, 6 Drawing Sheets

QUARTER-RATE SPECULATIVE DECISION FEEDBACK EQUALIZER

FIELD

The embodiments discussed herein are related to decision feedback equalizers (DFE).

BACKGROUND

Many electronic systems have complex architectures that include many integrated circuits (IC's) that communicate with each other at increasingly higher data signal speeds. However, the higher speeds of data signals communicated between IC's may lead to signal degeneration in the form of pulse dispersion and inter-symbol interference (ISI) that may degrade the signal-to-noise ratio (SNR) of the data signals. One common way to compensate for such degeneration is to implement a decision feedback equalizer (DFE) circuit. However, conventionally configured DFE circuits may not operate at speeds fast enough for compensating for signal degeneration of high-speed data signals.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of relaxing a timing constraint associated with reducing inter-symbol interference (ISI) of input data includes adding an ISI cancellation value to input data received at a first clock rate to generate first speculative data. The method further includes subtracting the ISI cancellation value from the input data to generate second speculative data. The method also includes sampling the first speculative data and the second speculative data at a second clock rate that is one-fourth of the first clock rate such that a timing constraint associated with performing the ISI reduction is relaxed.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As described in further detail below, a speculative decision feedback equalizer (DFE) circuit may be configured in a manner such that inter-symbol interference (ISI) experienced by data received by the speculative DFE circuit may be performed at a clock rate that is one-fourth of the clock rate of the input data. Therefore, the timing constraints imposed on the speculative DFE circuit may be relaxed, which may allow for higher clock rates of the received input data.

Embodiments of the present invention will be explained with reference to the accompanying drawings.

Figure 1:
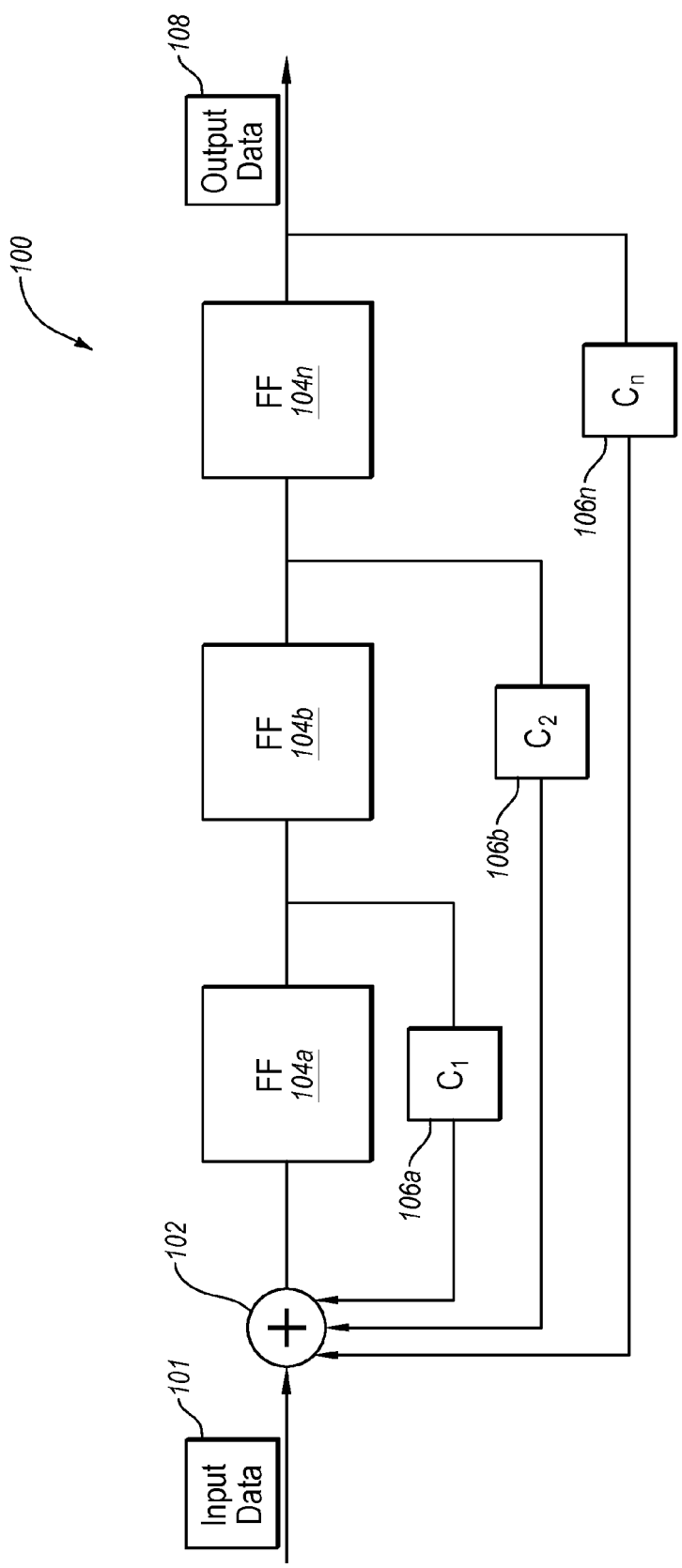
FIG. 1 illustrates a block diagram of an example decision feedback equalizer (DFE) circuit.

FIG. 1 illustrates a block diagram of an example DFE circuit 100. The DFE circuit 100 may be configured to receive input data 101 from a circuit of an electronic system over a communication channel or from some other source. The input data 101 may experience inter-symbol interference (ISI) when different bits of the input data 101 interfere with each other during propagation over the communication channel. The ISI may make it difficult or impossible to read the input data 101. Therefore, the DFE circuit 100 may be configured to compensate for at least some of the ISI experienced by the input data 101 such that the input data 101 may be more easily read.

The DFE circuit 100 may compensate for ISI by applying ISI cancellation values to the input data 101 that may be based on one or more previous values (e.g., bit value) of the input data 101. The number of previous values of the input data 101 used to compensate for ISI may be associated with a number of taps 106 of the DFE circuit 100. For example, a one-tap DFE circuit 100 may compensate for ISI based on a first preceding value of the input data 101, a two-tap DFE circuit 100 may compensate for ISI based on first and second preceding values of the input data 101, etc. Accordingly, application of the ISI cancellation values to the input data 101 may result in output data 108 that may have at least a portion of the ISI cancelled therefrom.

Each of the taps 106 of the DFE circuit 100 may be configured to receive an associated previous value of the input data 101 and may apply an associated ISI cancellation value to the input data 101 based on the associated previous value. For example, the DFE circuit 100 may include a flip-flop 104a configured such that the output of the flip-flop 104a is the previous value of the input data 101. A tap 106a may be configured to receive the previous value and, based on the previous value (e.g., whether the previous value was a "1" or a "0"), the tap 106a may add a cancellation value $C_1$ to the input data 101 or subtract the cancellation value $C_1$ from the input data 101 via a summer 102. Accordingly, the tap 106a may compensate for ISI experienced by the input data 101 that may be caused by a previous value of the input data 101. In some embodiments, the DFE circuit 100 may include any number of additional taps 106b-106n and flip-flops 104b-104n similarly configured to compensate for ISI experienced by the input data 101 that may be caused by the second through nth previous values of the input data 101. Modifications, additions, or omissions may be made to the DFE circuit 100 without departing from the scope of the present disclosure. For example, the DFE circuit 100 may be configured to have any number of taps 106 depending on the desired application and implementation of the DFE circuit 100.

As the data rate of the input data received by a DFE circuit increases, timing constraints imposed on the DFE circuit for compensating for ISI may be tighter. Therefore, a DFE circuit may be configured as a speculative DFE circuit to improve the timing constraints imposed on the DFE circuit. A speculative DFE circuit may add an ISI cancellation value, such as the cancellation value $C_1$, to input data to generate first speculative data associated with the addition of the ISI cancellation value. The speculative DFE circuit may also subtract the ISI cancellation value from the input data at the same time the addition is occurring to generate second speculative data associated with the subtraction of the ISI cancellation value. The speculative DFE circuit may use a digital filter to select which of the first or second speculative data to use as output data based on one or more previous values of the input data. Accordingly, the speed of a speculative DFE circuit may be increased as compared to a non-speculative DFE circuit because the addition or subtraction associated with an ISI cancellation value may be performed before having to determine a previous value of input data.

As mentioned above and detailed below, a speculative DFE circuit implemented according to the present disclosure may be configured such that the speculative ISI cancellation may be performed at a clock rate that is one-fourth of the data rate of input data. As detailed below with respect to FIGS. 2A, 2B, and 3, such an implementation may be accomplished through demultiplexing speculative data associated with the input data such that values of the input data may have ISI compensation performed thereon in a parallel manner. Therefore, through a speculative quarter-rate implementation, the timing constraints imposed on the speculative DFE circuit may be relaxed to allow for faster data rates of the input data.

Figure 2A:
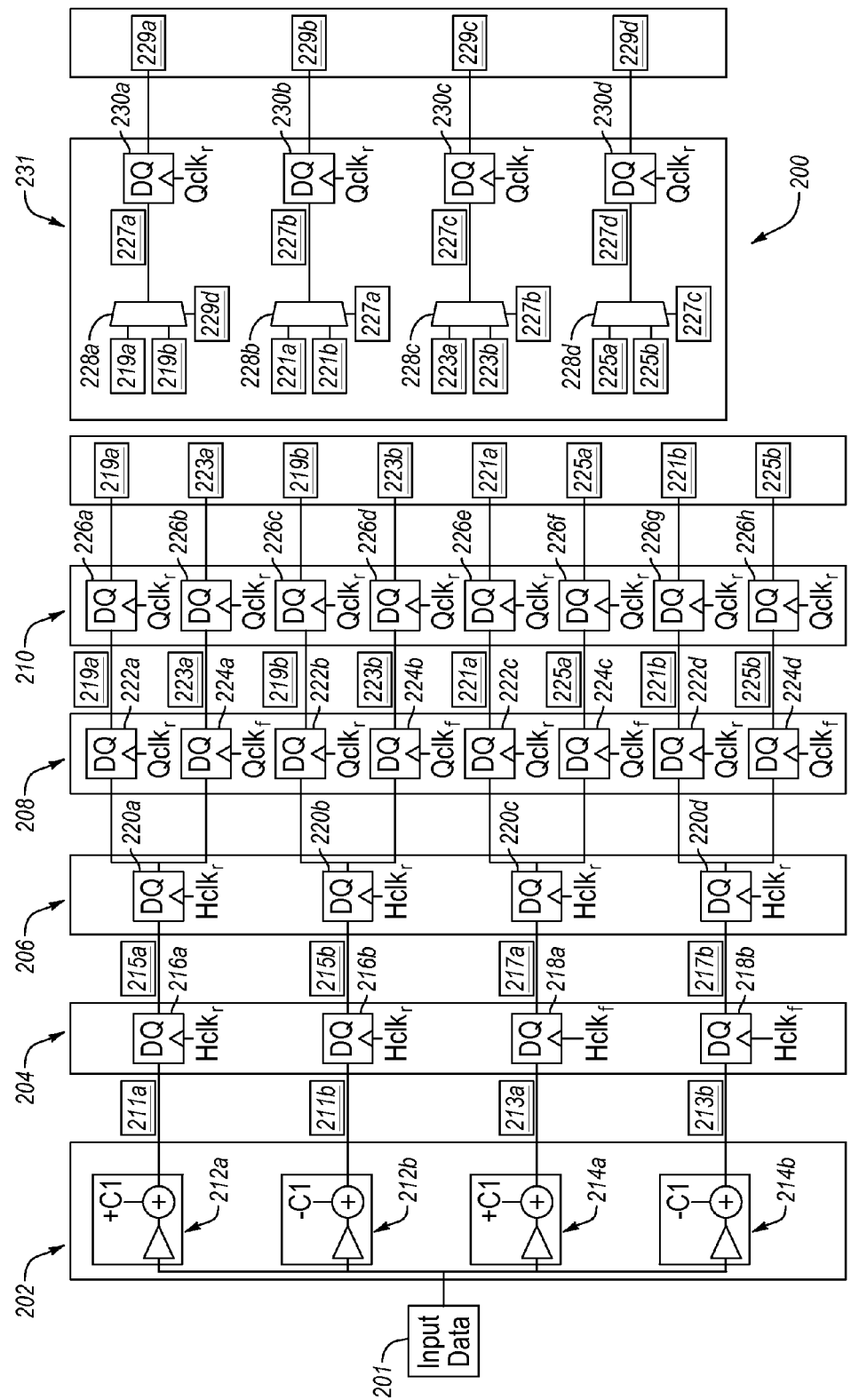
FIG. 2A illustrates an example of a single-tap speculative DFE circuit configured to operate at a quarter-clock rate.

FIG. 2A illustrates an example single-tap speculative DFE circuit 200 (hereinafter "DFE Circuit 200") configured to operate at a quarter-clock rate, arranged in accordance with at least some embodiments of the present disclosure. The DFE circuit 200 may include a speculative analog circuit 202 configured to receive input data 201. The input data 201 may include a plurality of values 209 (depicted in FIG. 2B) that may include one or more bits of information. The DFE circuit 200 may receive the values 209 of the input data 201 in a sequential manner based on a clock 203 (depicted in FIG. 2B as Clk).

The speculative analog circuit 202 may include summing circuits 212a, 212b, 214a, and 214b that may each receive the input data 201. The summing circuits 212a and 214a may be configured to add an ISI cancellation value $C_1$ to the received input data 201 to generate speculative data 211a and 213a, respectively. The summing circuits 212b and 214b may be configured to add a negative of the ISI cancellation value $C_1$ to the input data 201 to thus subtract the ISI cancellation value $C_1$ to generate speculative data 211b and 213b, respectively. The ISI cancellation value $C_1$ may be associated with cancelling ISI experienced by a value 209 of the input data 201 from the previous value 209 of the input data 201. The summing circuits 212a and 212b and 214a and 214b may be communicatively coupled to a half-rate sampling circuit 204.

The half-rate sampling circuit 204 may include flip-flops 216a and 216b, communicatively coupled to the summing circuits 212a and 212b, respectively. Therefore, the flip-flop 216a receives the speculative data 211a from the summing circuit 212a and the flip-flop 216b receives the speculative data 211b from the summing circuit 212b. Similarly, the half-rate sampling circuit 204 may include flip-flops 218a and 218b communicatively coupled to the summing circuits 214a and 214b, respectively. Accordingly, the flip-flop 218a receives the speculative data 213a from the summing circuit 214a and the flip-flop 218b receives the speculative data 213b from the summing circuit 214b.

Figure 2B:
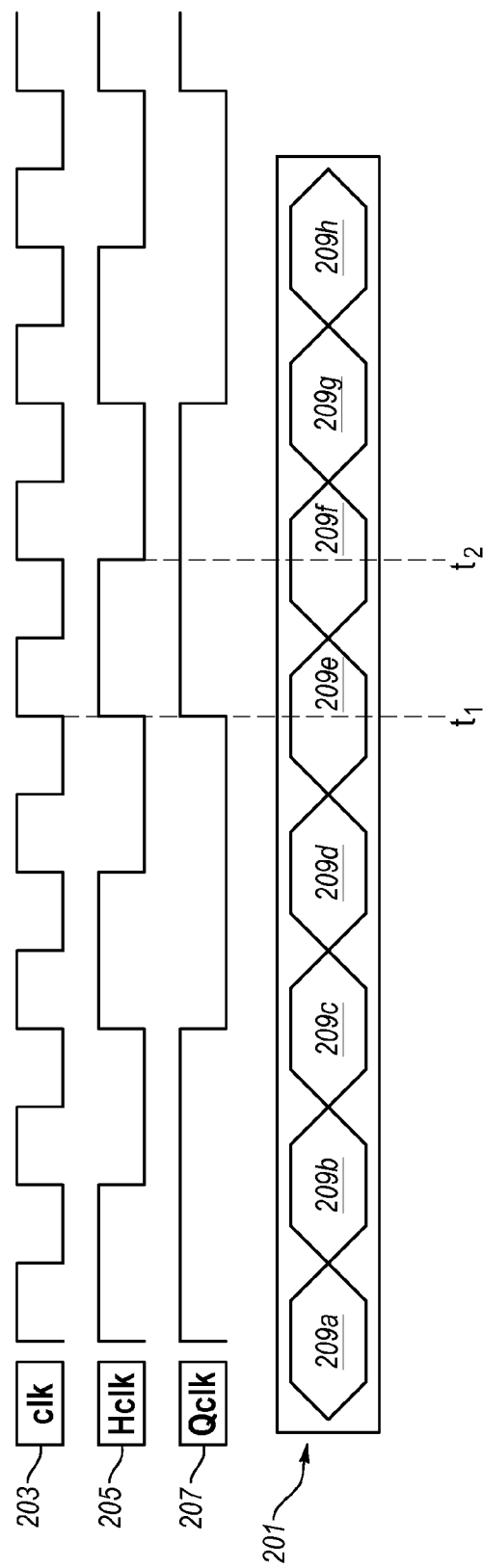
FIG. 2B illustrates timing associated with the single-tap speculative DFE circuit of FIG. 2A.

The flip-flops 216a and 216b of the half-rate sampling circuit 204 may be configured to sample the speculative data 211a and 211b on a rising edge of a half-clock 205 (depicted in FIG. 2B as Hclk). The rising edge of the half-clock 205 is illustrated as Hclk, in FIG. 2A. The flip-flops 218a and 218b of the half-rate sampling circuit 204 may be configured to sample the speculative data 213a and 213b on a falling edge of the half-clock 205. The falling edge of the half-clock 205 is illustrated as Hclk$_f$ in FIG. 2A.

As the name denotes, and as illustrated in FIG. 2B, the half-clock 205 may have a rate that is one-half of the rate of the clock 203. Therefore, the flip-flops 216a and 216b may sample the speculative data 211a and 211b, respectively, associated with every other value 209 of the input data 201. Additionally, the flip-flops 218a and 218b may sample the speculative data 213a and 213b, respectively, associated with the other values 209 of the input data 201.

For example, as illustrated in FIG. 2B, at a time $t_1$ the input data 201 may have a value 209e. Accordingly, at the time $t_1$, the speculative data 211a, 211b, 213a, and 213b may be associated with the value 209e. Additionally, at the time $t_1$, the half-clock 205 may go from "low" to "high" such that the rising edge of the half-clock 205 occurs at the time $t_1$. Therefore, at the time $t_1$, the flip-flops 216a and 216b may sample the speculative data 211a and 211b, respectively, such that the speculative data 211a and 211b sampled by the flip-flops 216a and 216b at the time $t_1$ may be associated with the value 209e of the input data 201. However, the flip-flops 218a and 218b may not sample the speculative data 213a and 213b, respectively, at the time $t_1$ because the flip-flops 218a and 218b may be configured to sample on the falling edge of the half-clock 205, not the rising edge.

At a time $t_2$, the half-clock 205 may go from "high" to "low" such that the falling edge of the half-clock 205 may occur at the time $t_2$. Therefore, the flip-flops 218a and 218b may sample the speculative data 213a and 213b, respectively, at the time $t_2$. Further, as illustrated in FIG. 2B, the input data 201 may have a value 209f at the time $t_2$ such that the speculative data 213a and 213b sampled by the flip-flops 218a and 218b, respectively, at the time $t_2$ may be associated with the value 209f of the input data 201. Additionally, at the time $t_2$, the flip-flops 216a and 216b may not sample the speculative data 211a and 211b, respectively, because the flip-flops 216a and 216b may be configured to sample on the rising edge of the half-clock 205, not the falling edge.

Therefore, the outputs of the flip-flops 216a and 216b, may be "even" speculative data 215a and 215b, respectively, that may be associated with an "even" value 209 (e.g., the value 209e) of the input data 201. Further, the outputs of the flip-flops 218a and 218b may be "odd" speculative data 217a and 217b, respectively, that may be associated with an "odd" value 209 of the input data 201. The terms "even" and "odd" are used to denote that "even" values 209 of the input data 201 are sequentially next to "odd" values 209 of the input data 201 in the same manner that "even" integers may be sequentially next to "odd" integers in an integer sequence incremented by one. The terms "even" and "odd" do not denote or correspond to the actual information (e.g., a "1" bit or a "0" bit) included in the values 209. Accordingly, the half-rate sampling circuit 204 may demultiplex speculative data 211a and 211b, and 213a and 213b associated with consecutive values 209 of the input data 201 (e.g. values 209e and 209f) into parallel outputs of even speculative data 215a and 215b and odd speculative data 217a and 217b.

The flip-flops 216a and 216b may be communicatively coupled to flip-flops 220a and 220b, respectively, of a half-rate aligning circuit 206 such that the flip-flops 220a and 220b receive the even speculative data 215a and 215b from the flip-flops 216a and 216b, respectively. The flip-flops 218a and 218b may be communicatively coupled to flip-flops 220c and 220d, respectively, of the half-rate aligning circuit 206 such that the flip-flops 220c and 220d receive the odd speculative data 217a and 217b from the flip-flops 218a and 218b, respectively.

The flip-flops 220a-220d may be configured to sample the even speculative data 215a and 215b and the odd speculative data 217a and 217b, on the rising edge of the half-clock 205 such that the even speculative data 215a and 215b may be substantially time aligned with the odd speculative data 217a and 217b at the outputs of the flip-flops 220a-220d. The outputs of the flip-flops 220a-220d may be outputs of the half-rate aligning circuit 206.

The half-rate aligning circuit 206 may be communicatively coupled to a quarter-rate sampling circuit 208 configured to sample the even speculative data 215a and 215b, and the odd speculative data 217a and 217b based on a quarter-clock 207 (depicted in FIG. 2B as (Qclk). A rising edge of the quarter-clock 207 is illustrated as Qclk$_r$ in FIG. 2A. A falling edge of the quarter-clock 207 is illustrated as Qclk$_f$ in FIG. 2A. The quarter-clock 207 may be configured at a rate that is one-fourth of the rate of the clock 203, as illustrated in FIG. 2B.

The quarter-rate sampling circuit 208 may include flip-flops 222a-222d and 224a-224d arranged in sets where each set may be configured to receive one of the even speculative data 215a or 215b, or the odd speculative data 217a or 217b from a respective flip-flop of the flip-flops 220a-220d. For example, the flip-flops 222a and 224a may be a set of flip-flops configured to receive the even speculative data 215a from the flip-flop 220a, the flip-flops 222b and 224b may be a set of flip-flops configured to receive the even speculative data 215b from the flip-flop 220b, the flip-flops 222c and 224c may be a set of flip-flops configured to receive the odd speculative data 217a from the flip-flop 220c, and the flip-flops 222d and 224d may be a set of flip-flops configured to receive the odd speculative data 217b from the flip-flop 220d.

The flip-flops 222a-222d may be configured to sample the even speculative data 215a or 215b, or the odd speculative data 217a or 217b respectively received by each of the flip-flops 222a-222d on the rising edge of the quarter-clock 207. The flip-flops 224a-224d may be configured to sample the even speculative data 215a or 215b, or the odd speculative data 217a, or 217b respectively received by each of the flip-flops 224a-224d on the falling edge of the quarter-clock 207.

The quarter-rate sampling circuit 208 may demultiplex even speculative data 215a and 215b associated with consecutive even values 209 of the input data 201 into parallel outputs of even speculative data 219a and 219b and next-even speculative data 223a and 223b. For example, the even speculative data 219a and 219b may be associated with the even value 209e of the input data 201 and the next-even speculative data 223a and 223b may be associated with the next even value 209g of the input data 201.

The quarter-rate sampling circuit 208 may also demultiplex odd speculative data 217a and 217b associated with consecutive odd values 209 of the input data 201 into parallel outputs of odd speculative data 221a and 221b and next-odd speculative data 225a and 225b. For example, the odd speculative data 221a and 221b may be associated with the odd value 209f of the input data 201 and the next-odd speculative data 225a and 225b may be associated with the odd value 209h of the input data 201.

Consider an example of data flow through quarter-rate sampling circuit 208 in which the even speculative data 215a sampled by the flip-flop 222a on the rising edge of the quarter-clock 207 may be associated with an "even" value 209e of the input data 201. Therefore, the even speculative data 219a output by the flip-flop 222a may be associated with the "even" value 209e of the input data 201. Additionally, due to the quarter rate of the quarter clock 207, the even speculative data 215a sampled by the flip-flop 224a on the next falling edge of the quarter-clock 207 may be associated with the "even" value 209g of the input data 201, which may be the next even value 209 after the even value 209e. Therefore, the next-even speculative data 223a output by the flip-flop 224a may be associated with the next even value 209 with respect to the even value 209 associated with the even speculative data 219a. As such, the flip-flops 222a and 224a may demultiplex the even speculative data 215a into parallel outputs of even speculative data 219a and next-even speculative data 223a that may be associated with consecutive even values 209 of the input data 201. The flip-flops 222b, 222c, and 222d and 224b, 224c, and 224d may similarly demultiplex the even speculative data 215b, the odd speculative data 217a, and the odd speculative data 217b, respectively, into parallel outputs of even speculative data 219b and next-even speculative data 223b, odd speculative data 221a and next-odd speculative data 225a, and odd speculative data 221b and next-odd speculative data 225b, respectively.

A quarter-rate aligning circuit 210 of the DFE circuit 200 may include flip-flops 226a-226h each configured to receive one of the even speculative data 219a and 219b, the odd speculative data 221a and 221b, the next-even speculative data 223a and 223b, and the next-odd speculative data 225a and 225b. The flip-flops 226a-226h of the quarter-rate aligning circuit 210 may be configured to sample the respective speculative data on the rising edge of the quarter-clock 207. Therefore, the even speculative data 219a and 219b, the odd speculative data 221a and 221b, the next-even speculative data 223a and 223b, and the next-odd speculative data 225a and 225b may be substantially time aligned at the outputs of the flip-flops 226. The outputs of the flip-flops 226 may be the outputs of the quarter-rate aligning circuit 210. The time aligned even speculative data 219a and 219b, odd speculative data 221a and 221b, next-even speculative data 223a and 223b, and next-odd speculative data 225a and 225b may be received from the quarter-rate aligning circuit 210 by a digital filter 231.

The digital filter 231 may include a selector 228a configured to receive the even speculative data 219a and 219b from the flip-flops 226a and 226b of the quarter-rate aligning circuit 210. The selector 228a may be configured to select one of the even speculative data 219a or 219b to generate output data 227a. The output data 227a may accordingly be associated with a value 209 of the input data 201 that may be associated with the even speculative data 219a and 219b. For example, the even speculative data 219a and 219b may be associated with a value 209e such that the output data 227a may be associated with the value 209e.

The digital filter 231 may include a selector 228b configured to receive the odd speculative data 221a and 221b from the flip-flops 226c and 226d of the quarter-rate aligning circuit. The selector 228b may be configured to select one of the odd speculative data 221a or 221b to generate output data 227b associated with a value 209 of the input data 201 that may be associated with the odd speculative data 221a and 221b. The value 209 associated with the output data 227b may be the next value 209 with respect to the value 209 associated with the output data 227a. For example, the value 209 associated with the output data 227b may be the value 209f when the value 209 associated with the output data 227a is the value 209e.

The digital filter 231 may include a selector 228c configured to receive the next-even speculative data 223a or 223b from the flip-flops 226e and 226f of the quarter-rate aligning circuit. The selector 228c may be configured to select one of the next-even speculative data 223a and 223b to generate an output data 227c associated with a value 209 of the input data 201 that may be associated with the next-even speculative data 223a and 223b. The value 209 associated with the output data 227c may be the next value 209 with respect to the value 209 associated with the output data 227b. For example, the value 209 associated with the output data 227c may be the value 209g when the value 209 associated with the output data 227b is the value 209f.

The digital filter 231 may include a selector 228d configured to receive the next-odd speculative data 225a and 225b from the flip-flops 226g and 226h of the quarter-rate aligning circuit. The selector 228d may be configured to select one of the next-odd speculative data 225a or 225b to generate output data 227d associated with a value 209 of the input data 201 that may be associated with the next-odd speculative data 225a and 225b. The value 209 associated with the output data 227d may be the next value 209 with respect to the value 209 associated with the output data 227c. For example, the value 209 associated with the output data 227d may be the value 209h when the value 209 associated with the output data 227c is the value 209g.

The output data 227a-227d may be received by flip-flops 230a-230d, respectively. The flip-flops 230a-230d may be configured to output previous-output data 229a-229d until sampling the respectively received output data 227 on the rising edge of the quarter-clock 207.

The value 209 associated with the previous-output data 229 output by a flip-flop 230 may be the fourth previous value 209 associated with the output data 227 received at the input of the flip-flop 230 because the clock rate of the quarter-clock 207 may be one fourth of the clock rate of the clock 203. For example, the previous-output data 229a output by the flip-flop 230a may be associated with a value 209a of the input data 201 if the output data 227a received at the input of the flip-flop 230a is associated with a value 209e of the input data 201; the previous-output data 229b output by the flip-flop 230b may be associated with a value 209b of the input data 201 if the output data 227b received at the input of the flip-flop 230b is associated with a value 209f of the input data 201; the previous-output data 229c output by the flip-flop 230c may be associated with a value 209c of the input data 201 if the output data 227c received at the input of the flip-flop 230c is associated with a value 209g of the input data 201; and the previous-output data 229d output by the flip-flop 230d may be associated with a value 209d of the input data 201 if the output data 227d received at the input of the flip-flop 230d is associated with a value 209h of the input data 201.

The selectors 228a-228d may be configured to select one of the respectively received speculative data based on the output data associated with the value 209 that may be previous to the value 209 associated with the received speculative data. For example, the previous-output data 229d may be associated with a value 209 of the input data 201 (e.g., the value 209d) that may be previous to the value 209 of the input data 201 associated with the even speculative data 219a and 219b received by the selector 228a (e.g. the value 209e).

Accordingly, the selector 228a may select the even speculative data 219a or 219b based on the previous-output data 229d. The selector 228b may similarly select one of the odd speculative data 221a or 221b based on the output data 227a because, as described above, the output data 227a may be associated with a value 209 of the input data 201 that may be previous to the value 209 of the input data 201 associated with the odd speculative data 221a and 221b. The selector 228c may similarly select one of the next-even speculative data 223a or 223b based on the output data 227b because, as described above, the output data 227b may be associated with a value 209 of the input data 201 that may be previous to the value 209 of the input data 201 associated with the next-even speculative data 223a and 223b. Further, the selector 228d may similarly select one of the next-odd speculative data 225a or 225b based on the output data 227c because, as described above, the output data 227c may be associated with a value 209 of the input data 201 that may be previous to the value 209 of the input data 201 associated with the next-odd speculative data 225a and 225b.

Therefore, the digital filter 231 may be configured to generate output data 227a-227d associated with four consecutive values 209 of the input data 201 in a parallel manner. This parallel configuration caused by sampling at one-fourth the clock rate of the clock 203 may relax a timing constraint associated with the operations of the digital filter because the output data 227a-227d may be sampled by the flip-flops 230a-230d at a clock rate that is one-fourth of the clock rate associated with the input data 201. Therefore, the time constraints imposed on the digital filter 231 may be relaxed.

For example, the timing constraint of the DFE 200 of FIG. 2 may be based on a critical path associated with the digital filter 231, where the following operations may need to be performed by the digital filter 231 between rising edges of the quarter-clock 207: (1) the flip-flop 230d may output previous-output data 229d; (2) the selector 228a may make a selection for the output data 227a based on the recently outputted previous-output data 229d; (3) the selector 228b may make a selection for the output data 227b based on the recently selected output data 227a; (4) the selector 228c may make a selection for the output data 227c based on the recently selected output data 227b; and (5) the selector 228d may make a selection for the output data 227d based on the recently selected output data 227c. The timing requirements associated with such a critical path may be expressed by the following equation:

$$4UI < t_{cq,FF} + t_{setup,FF} + 4 * t_{sq,MUX}$$

"UI" of the above equation may represent a "Unit Interval" that may be associated with a time period between values 209 of the input data 201 and "4UI" may be associated with the timing constraint of the DFE circuit 200. Additionally, in the above equation, "$t_{cq,FF}$" may represent the delay of the flip-flop 230d from the time of receiving the rising edge of the quarter-clock signal 207 to outputting the previous-output data 229d, "$t_{setup,FF}$" may represent a setup time of the flip-flop 230d, and "$t_{sq,MUX}$" may represent the delay of selectors 228a-228d from the time of receiving selecting data to outputting the respective output data 227a-227d.

In contrast, a conventionally implemented speculative DFE may have a timing requirement expressed by the following equation:

$$UI < t_{cq,FF} + t_{setup,FF} + t_{sq,MUX}$$

As illustrated by comparing the two equations, the timing constraint of the DFE circuit 200 (e.g., "4UI") may be four-times that of the timing constraint of a conventionally configured DFE (e.g., "4UI"). The DFE circuit 200 may have a timing advantage over the conventionally configured DFE because the constant part of the two equations (e.g., $t_{cq,FF}$ + $t_{setup,FF}$) may be a smaller percentage of the timing constraint even though some of the increased time associated with the timing constraint of the DFE circuit 200 is used by extra selectors. As such, the DFE circuit 200 of the present disclosure may be implemented in faster communication systems.

Modifications, additions, or omissions may be made to FIGS. 2A and 2B without departing from the scope of the present disclosure. For example, the clock rates may vary according to particular implementations. Additionally, which flip-flops sample data on the rising edge of an associated clock and which flip-flops sample data on the falling edge of an associated clock is given merely as an example implementation. Also, in some embodiments, the half-rate aligners and/or the quarter-rate aligners may be omitted. Further, the DFE circuit 200 of FIGS. 2A and 2B is described in the context of a single-tap DFE. However, a speculative DFE with more than one tap may be implemented in accordance to the present disclosure.

Figure 3A:
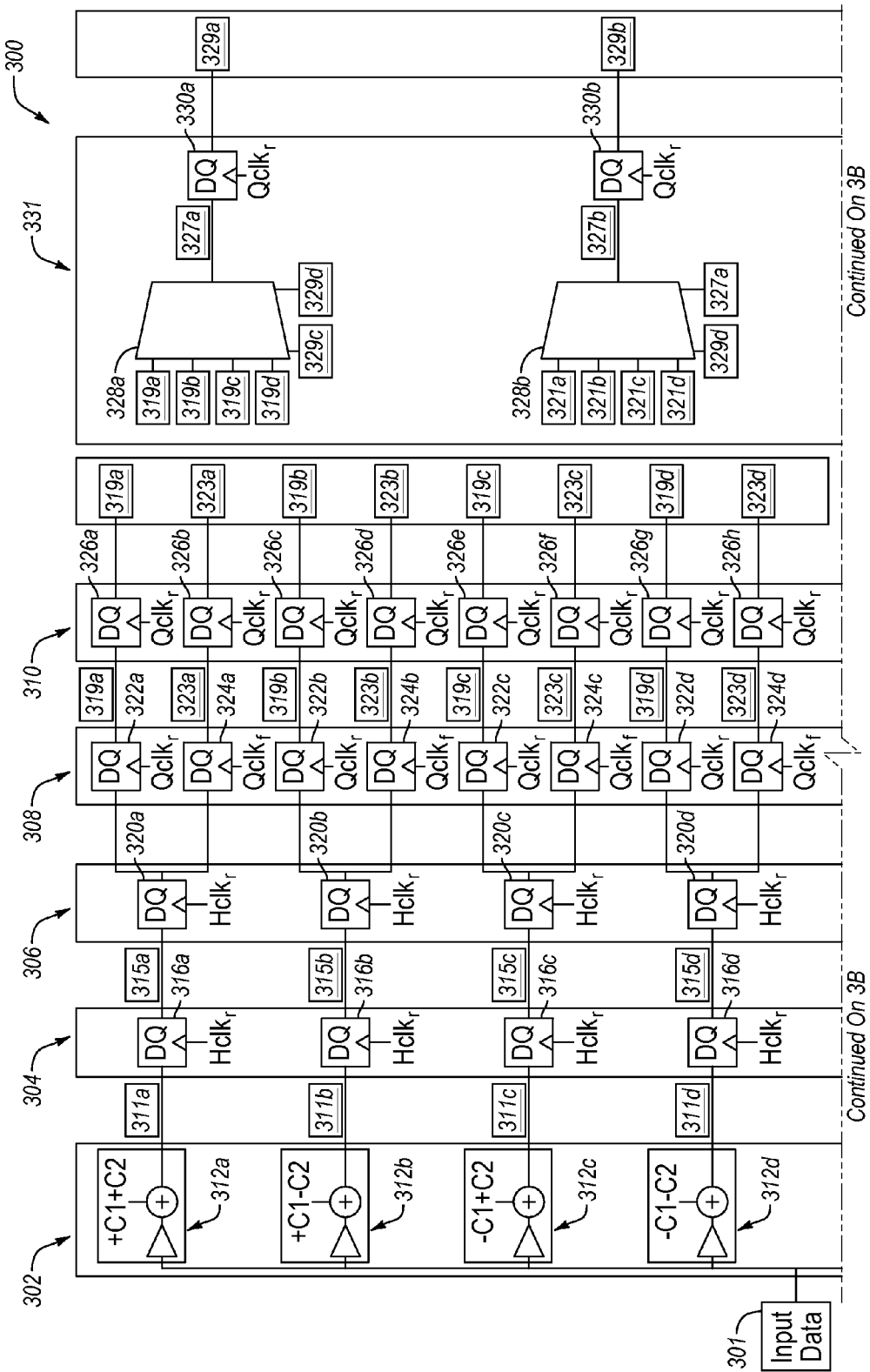
FIGS. 3A and 3B illustrate an example of a dual-tap speculative DFE circuit configured to operate at a quarter-clock rate.
Figure 3B:
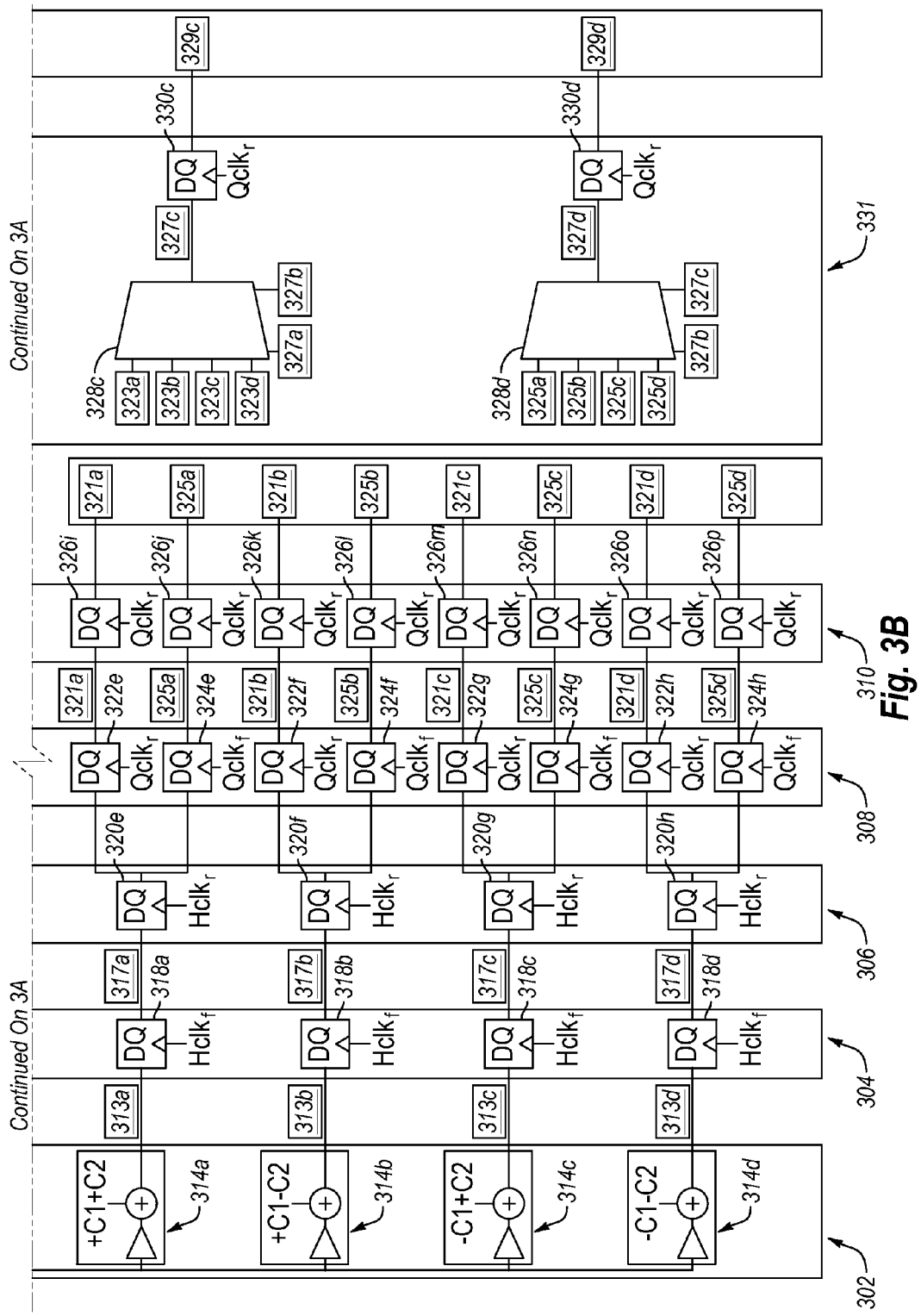

For example, FIGS. 3A and 3B illustrate an example embodiment of a two-tap speculative DFE circuit 300 (hereinafter "DFE circuit 300") configured to operate at a quarter-clock rate, arranged in accordance with at least some embodiments of the present disclosure. The DFE circuit 300 may be substantially similar to the DFE circuit 200 of FIG. 2A, except, the DFE circuit 300 may perform ISI cancellation based on the first and second previous values of input data 301 received by the DFE circuit 300.

For example, a speculative analog circuit 302 of the DFE circuit 300 may include summing circuits 312a-312d and 314a-314d that may be configured to generate speculative data 311a-311d, and 313a-313d, respectively. The speculative data 311a and 313a may be associated with the summing circuits 312a and 314a adding an ISI cancellation value $C_1$ and an ISI cancellation value $C_2$ to the received input data 301. The ISI cancellation value $C_1$ may be associated with the ISI experienced by the input data 301 from the previous value of the input data 301. The ISI cancellation value $C_2$ may be associated with the ISI experienced by the input data 301 from the second previous value of the input data 301. The speculative data 311b and 313b may be associated with the summing circuits 312b and 314b adding the ISI cancellation value $C_1$ to the received input data 301 and subtracting the ISI cancellation value $C_2$ from the received input data 301. The speculative data 311c and 313c may be associated with the summing circuits 312c and 314c subtracting the ISI cancellation value $C_1$ from the received input data 301 and adding the ISI cancellation value $C_2$ to the received input data 301. The speculative data 311d and 313d may be associated with the summing circuits 312d and 314d subtracting both the ISI cancellation value $C_1$ and the ISI cancellation value $C_2$ from the received input data 301.

A half-rate sampling circuit 304 may be configured to sample the speculative data 311a-311d on the rising edge of a half-clock that has a clock rate that is half the clock rate associated with the input data 301 to generate even speculative data 315a-315d, similar to the half-rate sampling circuit 204 configured to generate the even speculative data 211a and 211b described with respect to FIGS. 2A and 2B. The half-rate sampling circuit 304 may be similarly configured to sample the speculative data 313a-313d on the falling edge of the half-clock to generate odd speculative data 317a-317d, similar to the half-sampling circuit 204 configured to generate the odd speculative data 217a and 217b described above with respect to FIGS. 2A and 2B.

The DFE circuit 300 may include a half-rate aligning circuit 306 configured to receive the even speculative data 315a-315d and odd speculative data 317a-317d. The half-rate aligning circuit 306 may be configured to substantially time align the even speculative data 315a-315d with the odd speculative data 317a-317d on the rising edge of the half-clock, similar to the half-rate aligning circuit 206 time aligning the even speculative data 215a and 215b with the odd speculative data 217a and 217b on the rising edge of the half-clock 205, described above with respect to FIGS. 2A and 2B.

The DFE circuit 300 may include a quarter-rate sampling circuit 308 configured to receive the even speculative data 315a-315d and odd speculative data 317a-317d. The quarter-rate sampling circuit 308 may be configured to generate even speculative data 319a-319d and odd speculative data 321a-321d based on a rising edge of a quarter-clock that has a clock rate that is one-fourth of the clock rate associated with the input data 301, similar to the quarter-sampling circuit 208 generating even speculative data 219a and 219b, and odd speculative data 221a and 221b described with respect to FIGS. 2A and 2B. The quarter-rate sampling circuit 308 may also be configured to generate next-even speculative data 323a-323d, and next-odd speculative data 325a-325d based on a falling edge of the quarter-clock, similar to the quarter-rate sampling circuit 208 generating the next-even speculative data 223a and 223b, and next-odd speculative data 225a and described above with respect to FIGS. 2A and 2B.

A quarter-rate aligning circuit 310 of the DFE circuit 300 may be configured to receive the even speculative data 319a-319d, odd speculative data 321a-321d, next-even speculative data 323a-323d, and next-odd speculative data 325a-325d from the quarter-rate sampling circuit. The quarter-rate aligning circuit may be configured to substantially time align the even speculative data 319a-319d, odd speculative data 321a-321d, next-even speculative data 323a-323d, and next-odd speculative data 325a-325d on the rising edge of the quarter-clock, similar to the quarter-rate aligning circuit 210 time aligning the even speculative data 219a and 219b, the odd speculative data 221a and 221b, the next-even speculative data 223a and 223b, and the next-odd speculative data 225a and 225b, described above with respect to FIGS. 2A and 2B.

The DFE circuit 300 may include a digital filter 331 configured to generate output data 327a-327d and previous-output data 329a-329d, based on the output data associated with the two previous values of the input data 301, similar to the digital filter 231 generating output data 227a-227d and previous-output data 229a-229d based on the output data associated with the previous value of the input data 201, described above with respect to FIGS. 2A and 2B. For example, the digital filter 331 may include a selector 328a configured to receive the even speculative data 319a-319d from the quarter-rate aligning circuit 310. The selector 328a may also be configured to receive the previous-output data 329d and 329c that may be associated with two previous values of the input data 301 with respect to the value of the input data 301 associated with the speculative data 319a-319b. Based on the previous-output data 329d and 329c, the selector 328a may select one of the even speculative data 319a, 319b, 319c, or 319d to generate the output data 327a.

A selector 328b may be similarly configured to select one of the odd speculative data 321a, 321b, 321c, or 321d to generate the output data 327b based on the previous-output data 329d and the output data 327a. A selector 328c may be similarly configured to select one of the next-even speculative data 323a, 323b, 323c, or 323d to generate the output data 327c based on the output data 327a and the output data 327b. Further, a selector 328d may be similarly configured to select one of the next-odd speculative data 325a, 325b, 325c, or 325d to generate the output data 327d based on the output data 327b and the output data 327c.

Therefore, the digital filter 331 may be configured to generate output data 327a-327d associated with four consecutive values of the input data 301 in a parallel manner based on output values associated with the two previous values of the input data 301 with respect to the value of the input data 301 associated with the respective output value 327. Such a parallel configuration may relax the time constraints imposed on the digital filter 331 (and ultimately the speculative DFE circuit 300) because the output data 327a-327d may be sampled by the flip-flops 330a-330d at a clock rate that is one-fourth of the clock rate associated with the input data 301. Further, the addition of a tap may not change the critical path of the DFE circuit 300 with respect to the DFE circuit 200. Therefore, the additional tap may not change the timing constraint of the dual-tap speculative DFE circuit 300 with respect to the single-tap speculative DFE circuit 200.

Therefore, the dual-tap speculative DFE circuit 300, like the single-tap speculative DFE circuit 200 of FIGS. 2A and 2B, implemented based on a quarter-clock rate according to the present disclosure may have a timing advantage over a conventionally configured DFE. As such, the DFE circuit 300 of the present disclosure may be implemented in faster communication systems than some conventionally configured DFE circuits.

Modifications, additions, or omissions may be made to FIGS. 3A and 3B without departing from the scope of the present disclosure. For example, the clock rates may vary according to particular implementations. Additionally, which flip-flops sample data on the rising edge of an associated clock and which flip-flops sample data on the falling edge of an associated clock is given merely as an example implementation. Also, in some embodiments, the half-rate aligners and/or the quarter-rate aligners may be omitted. Further, the speculative DFE circuit 300 of FIGS. 3A and 3B is described in the context of a two-tap DFE. However, a speculative DFE with more than two taps may be implemented in accordance to the present disclosure.

Figure 4:
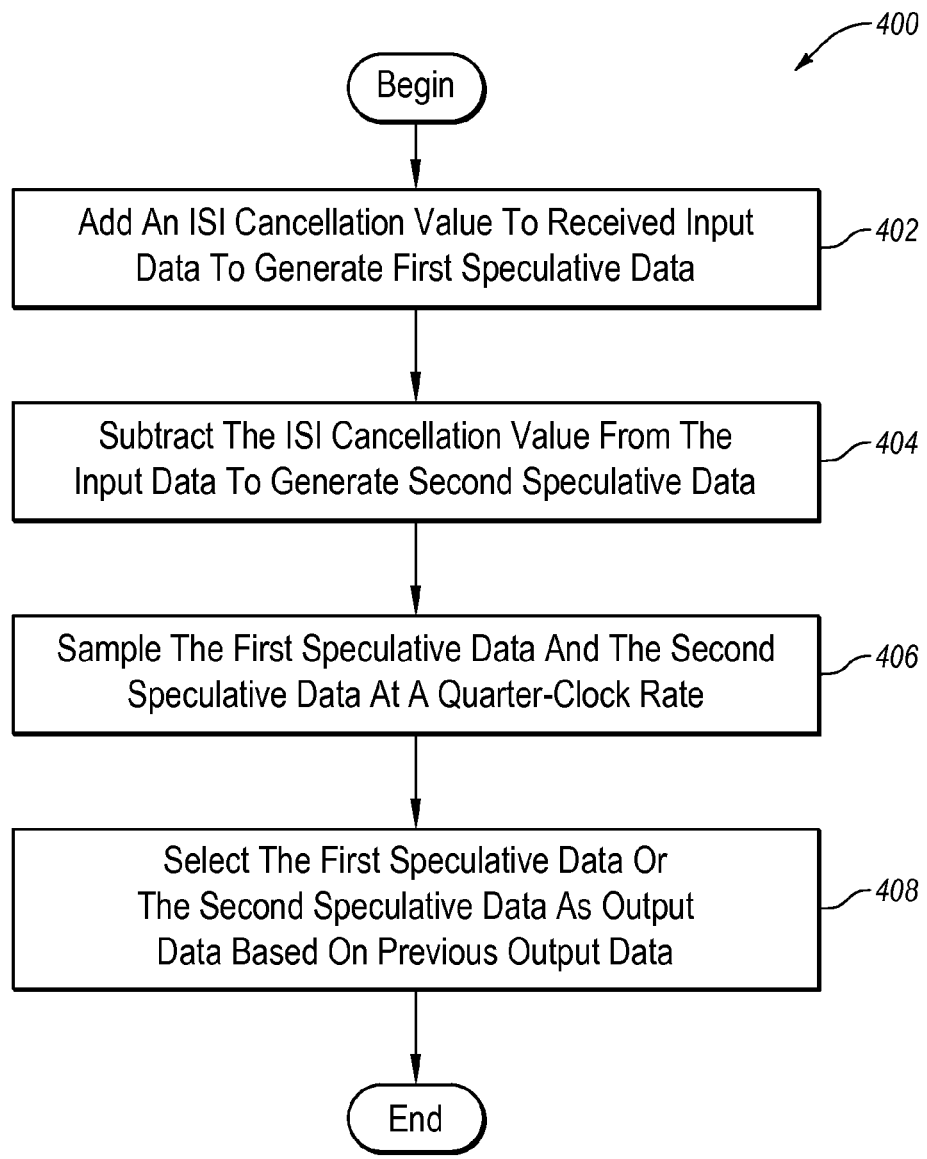
FIG. 4 is a flow chart of an example method of relaxing a timing constraint associated with reducing inter-symbol interference (ISI) of input data.

FIG. 4 illustrates an example method 400 of relaxing a timing constraint associated with reducing inter-symbol interference (ISI) of input data. The method 400 may be performed by any suitable DFE circuit configured according to the present disclosure, such as the DFE circuit 200 described with respect to FIGS. 2A and 2B, and the DFE circuit 300 described with respect to FIGS. 3A and 3B. Although illustrated as discrete blocks, various blocks may be divided into additional blocks, combined into fewer blocks, or eliminated, depending on the desired implementation Method 400 may start, and at block 402, an ISI cancellation value may be added to input data received by the DFE circuit at a first clock rate to generate first speculative data. In block 404, the ISI cancellation value may be subtracted from the input data to generate second speculative data. The first speculative data and the second speculative data may also be associated with the addition or subtraction of other ISI cancellation values with respect to the input data.

In block 406, the first speculative data and the second speculative data may be sampled at a quarter-clock rate that is one-fourth of the first clock rate. The sampling at the quarter-clock rate may be such that the first speculative data and the second speculative data may be associated with four consecutive values of the input data. Accordingly, as described above, a timing constraint associated with performing the ISI reduction may be relaxed.

In block 408, the first speculative data or the second speculative data may be selected as output data based on previous output data. The previous output data may be associated with any number of previous values of the input data depending on the number of taps of a DFE circuit. The first speculative data or the second speculative data may be selected within a time period associated with the timing constraint. Following the block 408, the method 400 may end.

The method 400 may be executed by a quarter-rate speculative DFE circuit configured according to the present disclosure to improve the timing constraints imposed on the DFE circuit. As such, the quarter-rate speculative DFE circuit may perform ISI reduction on input data that may be received at faster data rates than conventionally configured DFE circuits.

Modifications, additions, or omissions may be made to method 400 without departing from the scope of the present disclosure. For example, each block of the method 400 may include more or fewer operations than those described. Additionally, although the terms "first" and "second" are used to describe certain elements, these do not refer to the number of those elements, but are used to differentiate one from another. Further, other blocks and operations may be performed between each described block.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the invention.

What is claimed is:

1. A system for relaxing a timing constraint associated with reducing inter-symbol interference (ISI) of input data, the system comprising:
 a speculative analog circuit configured to:
  receive input data at a first clock rate;
  add an inter-symbol interference (ISI) cancellation value to the input data to generate first speculative data; and
  subtract the ISI cancellation value from the input data to generate second speculative data; and
 a sampling circuit communicatively coupled to the speculative analog circuit and configured to sample the first speculative data and the second speculative data at a second clock rate that is one-fourth of the first clock rate such that a timing constraint associated with performing the ISI reduction is relaxed.

2. The system of claim 1, wherein the speculative analog circuit is further configured to:
 add a second ISI cancellation value to at least one of the first speculative data and the second speculative data; and
 subtract the second ISI cancellation value from at least one of the first speculative data and the second speculative data.

3. The system of claim 1, wherein the timing constraint is relaxed by a factor of four.

4. The system of claim 1, wherein four consecutive values of input data are associated with the first speculative data and the four consecutive values of input data are associated with the second speculative data.

5. The system of claim 1, further comprising a digital filter communicatively coupled to the sampling circuit and configured to select the first speculative data or the second speculative data as output data based on previous output data, the digital filter configured to select the first speculative data or the second speculative data within a time period associated with the timing constraint.

6. The system of claim 5, wherein the output data is associated with four consecutive values of the input data.

7. The system of claim 5, wherein the previous output data is associated with one or more previous values of the input data.

8. The system of claim 1, wherein the first speculative data and the second speculative data are based on one or more previous values of the input data.

9. A method of increasing a timing constraint associated with reducing inter-symbol interference (ISI) of input data comprising:
adding an inter-symbol interference (ISI) cancellation value to input data received at a first clock rate to generate first speculative data;
subtracting the ISI cancellation value from the input data to generate second speculative data; and
sampling the first speculative data and the second speculative data at a second clock rate that is one-fourth of the first clock rate such that a timing constraint associated with performing the ISI reduction is relaxed.

10. The method of claim 9, further comprising:
adding a second ISI cancellation value to at least one of the first speculative data and the second speculative data; and
subtracting the second ISI cancellation value from at least one of the first speculative data and the second speculative data.

11. The method of claim 9, wherein the timing constraint is relaxed by a factor of four.

12. The method of claim 9, wherein four consecutive values of input data are associated with the first speculative data and the four consecutive values of input data are associated with the second speculative data.

13. The method of claim 9, further comprising selecting, within a time period associated with the timing constraint, the first speculative data or the second speculative data as output data based on previous output data.

14. The method of claim 13, wherein the output data is associated with four consecutive values of the input data.

15. The method of claim 13, wherein the previous output data is associated with one or more previous values of the input data.

16. The method of claim 9, wherein the first speculative data and the second speculative data are based on one or more previous values of the input data.

17. A decision feedback equalizer circuit (DFE) for relaxing a timing constraint associated with reducing inter-symbol interference (ISI) of input data comprising:
a speculative analog circuit configured to:
receive input data at a first clock rate;
add an inter-symbol interference (ISI) cancellation value to the input data to generate first speculative data; and
subtract the ISI cancellation value from the input data to generate second speculative data;
a sampling circuit communicatively coupled to the speculative analog circuit and configured to sample the first speculative data and the second speculative data at a second clock rate that is one-fourth of the first clock rate such that a timing constraint associated with performing the ISI reduction is relaxed by a factor of four; and
a digital filter communicatively coupled to the sampling circuit and configured to select the first speculative data or the second speculative data as output data based on previous output data, the digital filter configured to select the first speculative data or the second speculative data within a time period associated with the timing constraint.

18. The DFE circuit of claim 17, wherein four consecutive values of input data are associated with the first speculative data and the four consecutive values of input data are associated with the second speculative data.

19. The DFE circuit of claim 17, wherein the output data is associated with four consecutive values of the input data.

20. The DFE circuit of claim 17, wherein the previous output data is associated with one or more previous values of the input data.

21. The DFE circuit of claim 17, wherein the first speculative data and the second speculative data are based on one or more previous values of the input data.

* * * * *